(12) United States Patent
Schumann et al.

(10) Patent No.: US 12,468,032 B2
(45) Date of Patent: Nov. 11, 2025

(54) ULTRASONIC SYSTEM OF A VEHICLE FOR DETERMINING THE CONDITION OF THE ROADWAY

(71) Applicant: Robert Bosch GmbH, Stuttgart (DE)

(72) Inventors: Michael Schumann, Stuttgart (DE); Simon Weissenmayer, Flein (DE); Markus Mayer, Leinfelden-Echterdingen (DE); Timo Koenig, Unterheinriet (DE)

(73) Assignee: ROBERT BOSCH GMBH, Stuttgart (DE)

( * ) Notice: Subject to any disclaimer, the term of this patent is extended or adjusted under 35 U.S.C. 154(b) by 978 days.

(21) Appl. No.: 16/976,615

(22) PCT Filed: Apr. 25, 2019

(86) PCT No.: PCT/EP2019/060629
§ 371 (c)(1),
(2) Date: Aug. 28, 2020

(87) PCT Pub. No.: WO2019/211164
PCT Pub. Date: Nov. 7, 2019

(65) Prior Publication Data
US 2021/0048527 A1 Feb. 18, 2021

(30) Foreign Application Priority Data
May 2, 2018 (DE) .......................... 102018206741.4

(51) Int. Cl.
*G01S 15/00* (2020.01)
*B60T 8/172* (2006.01)
(Continued)

(52) U.S. Cl.
CPC ............ *G01S 15/931* (2013.01); *B60T 8/172* (2013.01); *B60W 40/06* (2013.01); *G01S 7/539* (2013.01);
(Continued)

(58) Field of Classification Search
CPC ........ G01S 15/931; G01S 15/86; G01S 7/539; G01S 15/36; G01S 2007/52012; G01S 2015/932; B60T 8/172; B60W 40/06
(Continued)

(56) References Cited

U.S. PATENT DOCUMENTS

| 2004/0204812 A1* | 10/2004 | Tran ....................... G01N 21/84 701/80 |
| 2012/0106291 A1* | 5/2012 | Klotz ................... G01S 7/5205 367/13 |

(Continued)

FOREIGN PATENT DOCUMENTS

| CN | 102481935 A | 5/2012 |
| CN | 105321353 A | 2/2016 |

(Continued)

OTHER PUBLICATIONS

International Search Report for PCT/EP2019/060629, Issued Jul. 11, 2019.
(Continued)

*Primary Examiner* — Tiffany P Young
(74) *Attorney, Agent, or Firm* — NORTON ROSE FULBRIGHT US LLP

(57) ABSTRACT

An ultrasonic system of a vehicle. The ultrasonic system includes: at least one ultrasonic sensor for ascertaining a distance of objects from the vehicle by comparing an emitted signal and a reflected echo, and a calculation apparatus for evaluating a measured signal of the ultrasonic sensor. The calculation apparatus is configured to determine
(Continued)

a variance of a ground echo distribution within a roadway portion on which the vehicle is moving, and to ascertain the condition of the roadway portion on the basis of at least one predefined classifier that associates individual values of the variance with a roadway condition.

9 Claims, 1 Drawing Sheet

(51) Int. Cl.
*B60W 40/06* (2012.01)
*G01S 7/539* (2006.01)
*G01S 15/36* (2006.01)
*G01S 15/86* (2020.01)
*G01S 15/931* (2020.01)
*G01S 7/52* (2006.01)

(52) U.S. Cl.
CPC .............. *G01S 15/36* (2013.01); *G01S 15/86* (2020.01); *G01S 2007/52012* (2013.01); *G01S 2015/932* (2013.01)

(58) Field of Classification Search
USPC .......................................................... 701/23
See application file for complete search history.

(56) References Cited

U.S. PATENT DOCUMENTS

| 2018/0210074 | A1* | 7/2018 | Hoare | G01S 7/539 |
| 2018/0239017 | A1* | 8/2018 | Milschewski | G06F 18/2415 |
| 2019/0277966 | A1* | 9/2019 | Schoessler | H04M 1/72454 |

FOREIGN PATENT DOCUMENTS

| CN | 106199614 A | 12/2016 |
| DE | 4117091 A1 * | 5/1991 |
| DE | 102004018088 A1 | 2/2005 |
| DE | 102011085287 A1 | 5/2013 |
| DE | 102012211293 A1 | 1/2014 |
| DE | 102013226631 A1 | 6/2015 |
| DE | 102015106404 A1 | 10/2016 |
| DE | 102016118307 A1 | 3/2018 |
| WO | 8901888 A1 | 3/1989 |

OTHER PUBLICATIONS

Kees N et al., "Road Surface Classification by Using a Polarimetric Coherent Radar Module at Millimeter Waves," Microwave Symposium Digest, IEEE MTT-S International, 1994, p. 1675 XP032365887.

* cited by examiner

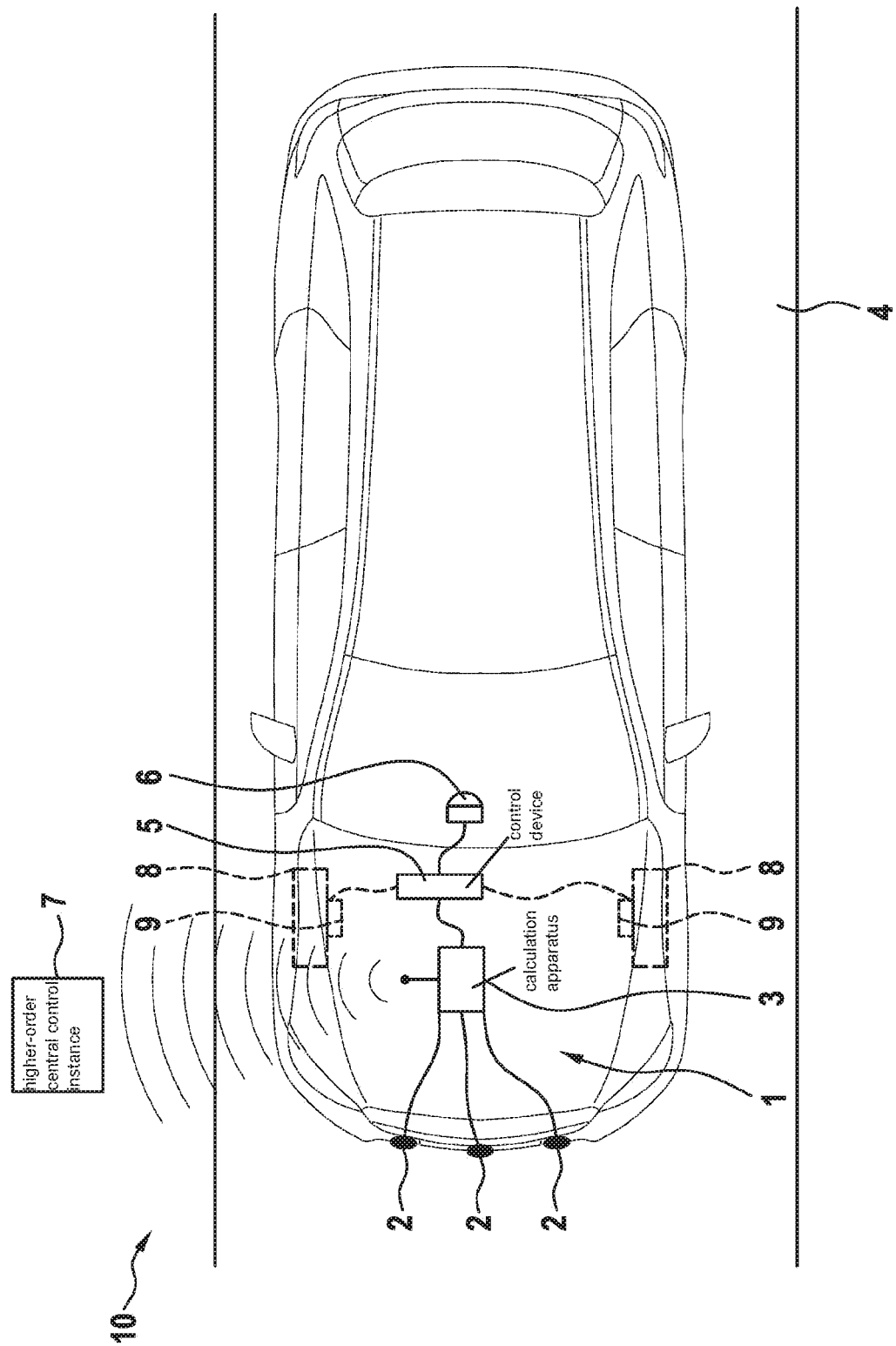

ULTRASONIC SYSTEM OF A VEHICLE FOR DETERMINING THE CONDITION OF THE ROADWAY

FIELD

The present invention relates to an ultrasonic system of a vehicle. The present invention further relates to a vehicle encompassing such an ultrasonic system. The present invention additionally relates to a method for detecting a condition of a roadway portion.

BACKGROUND INFORMATION

Roadway recognition systems are described in the related art. German Patent Application No. DE 10 2004 018 088 A1, for example, describes such a system. Here, a condition of a roadway can be inferred with the aid of an ultrasonic sensor and the data of a camera. German Patent Application No. DE 10 2013 226 631 A1 also describes a method for ascertaining a local roadway condition.

Ultrasonic systems in vehicles are generally available. They usually serve to ascertain a distance of objects from the sensor. For this, an acoustic signal is emitted and the reception of an echo is evaluated. A distance to the object that is reflecting the emitted signal in the echo can be ascertained therefrom.

SUMMARY

In accordance with an example embodiment, the ultrasonic system according to the present invention of a vehicle allows a condition of a roadway portion to be ascertained reliably and dependably. All that is needed for that purpose is an ultrasonic sensor. An ultrasonic sensor of this kind usually emits an output signal having a defined amplitude profile and/or frequency profile. When an echo is received by the ultrasonic sensor, a check is made as to whether that echo has a frequency profile corresponding to the emitted signal. In particular, a "matching factor" of the emitted signal and the echo can be ascertained. In addition, the amplitude profiles of the emitted signal and of the echo can be evaluated. If an amplitude of the echo, and/or the matching factor, is greater than a predefined threshold value, then an object is recognized.

The example ultrasonic system according to the present invention of a vehicle encompasses at least one ultrasonic sensor for ascertaining a distance of objects from the vehicle. The ultrasonic sensor is preferably configured for that purpose to carry out a comparison between the emitted signal and a reflected echo. This is accomplished, in particular, as previously described. The example ultrasonic system furthermore encompasses a calculation apparatus which may be implemented as a processor configured for evaluating a measured signal of the ultrasonic sensor. Provision is made here that the calculation apparatus is configured to determine a variance of a ground echo distribution within a roadway portion on which the vehicle is moving. In the case of ultrasonic sensors that are mounted on vehicles, a reflection from the substrate is usually also present in addition to a reflection from objects, so that echoes can be received from the ground. These signals are usually filtered out as an interference variable in order to make possible a distance measurement to objects. In the context of the present invention, however, these signals are to be used in order to estimate a roughness of the surface of the roadway, from which a condition of the roadway can be ascertained. Provision is made for that purpose that the calculation apparatus is configured to ascertain the condition of the roadway portion on the basis of at least one predefined classifier that associates individual values of the variance with a roadway condition. The predefined classifier is, in particular, historically learned values. For example, variances in the ground echo distribution can, in particular, be recorded and stored for various roadway conditions. If such a variance is detected later, it is then to be assumed that the ground roughness, i.e., the condition of the roadway, is the same as at the time of the recording. This makes it possible to ascertain, on the basis solely of an ultrasonic system, the condition of the roadway portion on which the vehicle is currently located. Additional sensors, for example the cameras required in the existing art, are not necessary in the context of the ultrasonic system according to the present invention.

Preferred refinements of the present invention are described herein.

Advantageously, the calculation apparatus is embodied to determine the variance, in particular proportionally, from a frequency of occurrence of the received ground echoes. An echo rate is thus incorporated into the calculation of the variance of the ground echo distribution. Alternatively or additionally, an amplitude of the ground echoes is used. Furthermore, alternatively or additionally, a matching factor of the emitted signal and the ground echo is used. Lastly, provision is advantageously made that the variance is determined by the calculation apparatus from a clutter level. The variance can furthermore be determined from the noise level. Also possible is a determination of all peak values in the measured signal in a specific distance range of the ultrasonic sensor in which the probability of occurrence of the ground echo is greatest. Provision is made here in particular that the statistical features maximum, minimum, variance, median, mean, skew and/or kurtosis are evaluated. An "unsteadiness" of the measured signals of the ultrasonic sensor can be ascertained, in particular, from all these parameters.

The unsteadiness depends on the condition of the roadway portion on which the vehicle is currently moving. The unsteadiness of the measured signal of the ultrasonic sensor can therefore be associated, based on the at least one predefined classifier, with a roadway condition. The roadway condition of the roadway portion currently being traveled on can thus be ascertained simply and with little outlay.

The present invention further relates to a vehicle. The example vehicle in accordance with an example embodiment of the present invention encompasses an ultrasonic system as described above. In particular, several ultrasonic sensors of the ultrasonic system are mounted on a front side and/or on a rear side. The ultrasonic sensors of the ultrasonic system serve in particular as a parking aid for detecting obstacles while parking. A condition of a roadway portion currently being driven on can additionally be ascertained based on the ultrasonic sensors.

Advantageously, the vehicle has a control device. The control device serves to implement a driver assistance function, in particular a driving dynamics regulation system, and/or an autonomous driving function of the vehicle. A "driver assistance function" is to be understood in particular to mean that an intervention in the driving dynamics of the vehicle occurs when the vehicle is being driven by a driver. This can be, in particular, a steering intervention, a braking intervention, and/or an acceleration intervention. The control device is advantageously configured to adapt the driver assistance function and/or the autonomous driving function to the ascertained condition of the roadway portion. The driver assistance function and/or the autonomous driving function can thus be implemented optimally and adapted to current environmental conditions. For example, when a snow cover is detected which is sufficiently deep that perceptible tire tracks can be recognized, the wheels of the vehicle can be brought to a complete stop upon maximum braking. The result is to build up in front of each tire a braking wedge with which an additional braking effect can be achieved. If a dry road with no damage is detected, usual control for avoiding wheel locking during braking can then be applied.

Particularly advantageously, the control device is embodied to specify a maximum speed of the vehicle based on the ascertained condition of the roadway portion. It is thus possible to adapt, by way of the control device, the maximum speed at which the vehicle can be moved. For example, lower maximum speeds are to be assumed for slick roadway portions, and/or for roadway portions that have potholes or the like, than on dry, undamaged roadway portions. Safety in the context of operation of the vehicle is thus enhanced by specifying the maximum speed based on the ascertained condition of the roadway portion.

Optimally, the vehicle has a warning apparatus. This makes it possible to warn the driver about poor roadway conditions. A warning is outputted to a driver of the vehicle in particular when a risk to the vehicle exists as a result of the condition of the roadway portion. That risk can be, on the one hand, damage to the vehicle itself, for example due to potholes, or alternatively a risk of loss of control of the vehicle by a driver. By way of the warning, the driver can be prompted to be more attentive and/or to adapt his or her driving style to the current conditions of the roadway portions being traveled on.

The present invention further relates to a method for detecting a condition of a roadway portion. In accordance with an example embodiment of the present invention, detection is accomplished based on at least one ultrasonic sensor of a vehicle. Provision is made that the ultrasonic sensor is embodied to ascertain a distance of objects from the vehicle by comparing an emitted signal and a reflected echo. Provision is made that the method encompasses the following steps: Firstly, a variance of a ground echo distribution within a roadway portion on which the vehicle is moving is determined. The condition of the roadway portion is then ascertained based on a classifier that associates each value of the variance with a roadway condition. The predefined classifier is, in particular, a historically learned value that has been ascertained by measuring the variance under different roadway conditions. The method is executed in particular using an ultrasonic system as described previously.

In a preferred embodiment of the present invention, the variance is ascertained, in particular proportionally, from a frequency of occurrence of the received ground echoes. This corresponds, in particular, to an echo rate. Alternatively or additionally, the variance is ascertained proportionally from an amplitude of the ground echoes. Provision is likewise made, alternatively or additionally, that the variance is ascertained proportionally from a matching factor of the emitted signal and the ground echo. Lastly, provision is made, alternatively or additionally, that the variance is determined proportionally from a clutter level. The variance can also be determined from the noise level. Also possible is a determination of all peak levels in the measured signal in a specific distance range of the ultrasonic sensor in which the probability of occurrence of the ground echoes is greatest. In particular, the statistical features maximum, minimum, variance, median, mean, skew and/or kurtosis are evaluated. The variance can thereby be determined in simple fashion and with little outlay. In particular, the condition of the roadway portion can be ascertained based on measured data that can be acquired using the ultrasonic sensor. Additional information that must be supplied by other types of sensor is not necessary.

The method is advantageously executed in such a way that the classifier is stored in a higher-order central control instance and is retrieved in order to ascertain the condition of the roadway portion. The condition of the roadway portion can thus be ascertained either by the higher-order central control instance, by the fact that the measured signals are transferred from the ultrasonic sensor to the higher-order central control instance. In particular, the variance of the ground echo distribution is previously determined from the measured signals of the ultrasonic sensor, only said variance being conveyed to the higher-order central control instance. In an alternative, the vehicle carrying the ultrasonic sensor can also itself ascertain said roadway condition. Provision is made for that purpose, in particular, that the higher-order central control instance transfers the classifier to the vehicle. Classifiers that change spatially can, in particular, be used. A current condition of a specific roadway portion can thus, in particular, be distinguished in detail. Provision is made for that purpose in particular that a position of the vehicle carrying the ultrasonic sensor is ascertained, it being possible to determine, based on the position, which classifier is to be used in order to ascertain the roadway condition from the variance.

Advantageously, a coefficient of friction of the roadway portion can be ascertained based on the condition of the roadway portion. Provision is made in this context in turn that the coefficient of friction is determined historically, meaning that the coefficient of friction is measured for specific conditions of the roadway. A corresponding coefficient of friction can thus be associated with each roadway condition. Based on the coefficient of friction, it is possible to estimate optimally the effects that braking interventions and/or steering interventions will have on guidance of the vehicle.

BRIEF DESCRIPTION OF THE DRAWINGS

Exemplifying embodiments of the present invention are described below in detail with reference to the FIGURE.

FIG. 1 schematically depicts a vehicle according to an exemplifying embodiment of the present invention, encompassing an ultrasonic system according to an exemplifying embodiment of the present invention.

DETAILED DESCRIPTION OF EXAMPLE EMBODIMENTS

FIG. 1 shows a vehicle 10 according to an exemplifying embodiment of the present invention. Vehicle 10 encompasses an ultrasonic system 1 according to an exemplifying embodiment of the present invention. Vehicle 10 is, in particular, embodied to determine, on the basis of ultrasonic system 1, a current condition of a roadway portion 4 on which vehicle 10 is currently moving.

Ultrasonic system 1 encompasses at least one ultrasonic sensor 2. In the exemplifying embodiment shown in FIG. 1, three ultrasonic sensors 2 are depicted by way of example. Ultrasonic system 1 furthermore encompasses a calculation apparatus 3. Calculation apparatus 3 is connected to ultrasonic sensors 2 for signal transfer. Each ultrasonic sensor 2 advantageously emits a signal that is reflected as an echo from an object in the surroundings of vehicle 10 or from the surface of roadway portion 4. Provision is made that each ultrasonic sensor 2 emits a signal having a different frequency profile, so that the echoes likewise have different frequency profiles; the result is to make possible an association as to which echo was originally emitted from which ultrasonic sensor 2.

Measured signals can be transferred from each ultrasonic sensor 2 to calculation apparatus 3. The measured signals are, in particular, a conversion of the echo received by ultrasonic sensor 2 into an electrical signal. Calculation apparatus 3 is embodied to ascertain a condition of roadway portion 4 on the basis of an unsteadiness of the measured signals of ultrasonic sensor 2. The unsteadiness of the measured signals corresponds to the variance of the ground echo distribution within roadway portion 4. This is calculated proportionally from a frequency of occurrence of received ground echoes (echo rate), an amplitude of the ground echoes, the matching factor between the emitted acoustic signal and the reflected ground echo, and the clutter level. Also possible is a determination of all the peak values in the measured signal in a specific distance range of each ultrasonic sensor 2 in which the probability of occurrence of the ground echoes is greatest. The statistical features maximum, minimum, variance, median, mean, skew and/or kurtosis are evaluated in this context.

For example, a clean and dry roadway portion 4 produces a characteristic unsteadiness in the measured signal of ultrasonic sensors 2 as a result of corresponding roughness and/or irregularities and/or potholes. A dry surface can be inferred if there has been no precipitation in a predefined preceding time interval, and if relative humidity during that time interval was low. The coefficient of friction for roadway portion 4 in such a condition is within the range of the maximum possible coefficient of friction.

If water and/or ice are present on roadway portion 4, they generate a lower unsteadiness in the echo, and thus in the measured signal of ultrasonic sensors 2, than a dry surface of roadway portion 4. In particular, a variety of cases can be distinguished as follows: Liquid water has the property of closing up the pores of a roadway surface and thereby reducing the unsteadiness of the measured signal. Water on the surface of the roadway portion generates, at higher speeds, an elevated noise level in the measured signal. Water that has frozen into ice, conversely, does not generate an elevated noise level even at higher speeds. Ice also closes up the pores of the roadway surface and thus produces a low coefficient of friction.

If grit and/or gravel and/or tire tracks in snow and/or slush blocks are present on roadway portion 4, they generate a greater unsteadiness in the measured signal than in the case of a dry roadway portion 4. Examples can be given of how the individual cases can be differentiated based on further information: Slush, as well as a damp or wet surface, produces an elevated noise level at high speeds, the unsteadiness being increased. Here as well, the ambient temperature can be utilized for plausibilization. The coefficient of friction of slush is very low. Frozen slush, on the other hand, does not generate a higher noise level, and unsteadiness is increased just as in the case of (unfrozen) slush. The coefficient of friction increases with decreasing temperature. If ice and/or frozen slush blocks are present on roadway portion 4, this causes an increased unsteadiness. An increased number of flattened slush blocks produces rapidly changing coefficients of friction.

If gravel and/or clumps of dirt are scattered on the road, their presence can be inferred in particular when the quantity of precipitation in a previous time interval was very high. Larger gravel elements can also result in more instances of recognition of objects on the roadway. The coefficient of friction changes rapidly: it is normal when the tire is in direct contact with the roadway, and low or very low when gravel gets between the tire and the roadway.

Tire tracks in snow are to be expected only at ambient temperatures close to the freezing point. Snow furthermore has a damping effect on unsteadiness, while the tracks in snow produce an increase in unsteadiness. Ultrasonic sensor 2 that is mounted centeredly on vehicle 10 should therefore detect a reduced unsteadiness, while ultrasonic sensors 2 mounted externally can detect an elevated unsteadiness. If the ambient temperature is furthermore at or below the freezing point for a predefined minimal time interval, it is then possible to infer a deep snow cover with tire tracks. Particularly deep tire tracks can likewise result in increased detection of objects on roadway portion 4. The coefficient of friction is very low or low.

Grit can be recognized simply from the fact that the unsteadiness is elevated. Grit is usually applied, at temperatures above the freezing point, into a repaired roadway. Grit can also be inferred if roadway portion 4 was previously closed. The coefficient of friction is low or very low.

Not all the criteria as described above need to be met in order to allow a particular condition to be inferred. The conditions can also occur in mutual superimposition. Provision is thus made in particular that calculation apparatus 3 individually calculates a probability, in particular also an intensity and a standard deviation, for each individual roadway portion 4. The condition of roadway portion 4 can be inferred from that probability.

It is therefore possible to ascertain the condition of roadway portion 4 from the measured signals of ultrasonic sensors 2 on the basis of the unsteadiness, with the aid of the at least one predefined classifier. This can occur, in particular, in a higher-order central control instance 7. For this purpose, calculation apparatus 3 merely calculates the variance of the ground echo distribution of the current roadway portion 4, and transmits the calculated data to higher-order control instance 7. The at least one predefined classifier is stored in higher-order central control instance 7. A condition of roadway portion 4 can thus be determined based on a comparison of the received variance and the classifier. That determined roadway condition can be transferred back to calculation apparatus 3 and is thus available to vehicle 10.

In an alternative, it is also possible for the higher-order central control instance to transfer current classifiers to calculation apparatus 3. Calculation apparatus 3 can then itself perform the comparison of the calculated variance with the classifier, so as thereby to determine the condition of roadway portion 4. As already described above, different coefficients of friction can be associated with the different conditions of the roadway portions. Provision is thus advantageously made that in higher-order central control instance 7, a corresponding coefficient of friction is associated with each condition of roadway portion 4. Those coefficients of friction are likewise transferred to calculation apparatus 3. Vehicle 10 thus has available to it not only the current condition of roadway portion 4 but also information regarding an expected coefficient of friction of the surface of roadway portion 4.

Vehicle 10 has, in particular, a control device 5 for performing a driver assistance function and/or an autonomous driving function of vehicle 10. Vehicle 10 also advantageously has a warning apparatus 6. This makes it possible to adapt the driver assistance function and/or the autonomous driving function to the current condition of roadway portion 4. A warning regarding poor conditions of roadway portion 4 can also be conveyed to a driver of vehicle 10 via warning apparatus 6. This makes it possible on the one hand for the driver assistance function and/or the autonomous driving function to avoid hazardous situations, for example by adapting a maximum speed or by carrying out intended braking interventions earlier than in normal conditions. On the other hand it is possible to encourage the driver to pay greater attention by outputting a warning via warning apparatus 6. The driver can then adapt his or her driving style to the prevailing conditions.

Control device 5 is configured, for example, to decelerate wheels 9 of vehicle 10 by way of brakes 8. In normal conditions, control device 5 performs a regulation action that prevents wheels 8 from locking during braking. If, conversely, as described above, a deep snow cover with existing tire tracks is detected and is outputted as a condition of roadway portion 4, control device 5 then applies control to brakes 9 of wheels 8 in such a way that they lock in the event of maximum braking. This produces a braking wedge of snow in front of the locking wheels 8, which results in an additional braking effect.

Control device 5 can also perform a variety of assistance functions that are effective and/or reliable only for specific conditions of roadway portion 4. If other conditions of roadway portion 4 are detected on the basis of ultrasonic system 1, the assistance systems are then deactivated.

Vehicle 10, in particular ultrasonic system 1, thus makes possible reliable and dependable recognition of a condition of a roadway portion 4 on which the vehicle is currently moving. This permits optimization of control devices 5 of vehicle 10 which affect driving dynamics of vehicle 10. No additional sensors are required in order to ascertain the condition of roadway portion 4. Roadway portion 4 can instead be ascertained solely on the basis of ultrasonic sensors 2. In particular, additional cameras, as in the existing art, can be dispensed with.

What is claimed is:

1. An ultrasonic system of a vehicle, comprising:
at least one ultrasonic sensor configured to ascertain a distance of objects from the vehicle by comparing an emitted signal and a reflected echo; and
a processor configured to:
evaluate a measured signal of the ultrasonic sensor;
determine a variance of a ground echo distribution within a roadway portion on which the vehicle is moving;
ascertain a condition of the roadway portion based on at least one predefined classifier that associates individual values of the variance with a roadway condition;
determine the variance proportionally from a matching factor of the emitted signal and a ground echo;
calculate an unsteadiness value, wherein the condition of the roadway portion is ascertained based on an association of the unsteadiness value with the at least one predefined classifier, wherein the unsteadiness value is derived from at least one of a maximum, minimum, variance, median, mean, skew and/or kurtosis of the ground echo;
determine the variance based on peak levels in a specific distance range of the ultrasonic sensor in which a probability of occurrence of the ground echoes is greatest; and
recognize an object when at least one of an amplitude of the echo and the matching factor exceeds a predefined threshold value.

2. A vehicle, comprising:
an ultrasonic system, including:
at least one ultrasonic sensor configured to ascertain a distance of objects from the vehicle by comparing an emitted signal and a reflected echo; and
a processor configured to:
evaluate a measured signal of the ultrasonic sensor;
determine a variance of a ground echo distribution within a roadway portion on which the vehicle is moving;
ascertain a condition of the roadway portion based on at least one predefined classifier that associates individual values of the variance with a roadway condition;
determine the variance proportionally from a matching factor of the emitted signal and a ground echo;
calculate an unsteadiness value, wherein the condition of the roadway portion is ascertained based on an association of the unsteadiness value with the at least one predefined classifier, wherein the unsteadiness value is derived from at least one of a maximum, minimum, variance, median, mean, skew and/or kurtosis of the ground echo,
determine the variance based on peak levels in a specific distance range of the ultrasonic sensor in which a probability of occurrence of the ground echoes is greatest; and
recognize an object when at least one of an amplitude of the echo and the matching factor exceeds a predefined threshold value.

3. The vehicle as recited in claim 2, wherein a driver assistance function and/or an autonomous driving function of the vehicle is executed, and the driver assistance function and/or the autonomous driving function is adapted to the ascertained condition of the roadway portion.

4. The vehicle as recited in claim 3, wherein a maximum speed of the vehicle is specified based on the ascertained condition of the roadway portion.

5. The vehicle as recited in claim 2, wherein a warning to a driver of the vehicle is output when a risk to the vehicle exists as a result of the ascertained condition of the roadway portion.

6. A method for detecting a condition of a roadway portion based on at least one ultrasonic sensor of a vehicle, the ultrasonic sensor being configured to ascertain a distance of objects from the vehicle by comparing an emitted signal and a reflected echo, the method comprising the following steps of:
determining a variance of a ground echo distribution within a roadway portion on which the vehicle is moving; and
ascertaining the condition of the roadway portion based on at least one predefined classifier that associates individual values of the variance with a roadway condition,
wherein the variance is determined proportionally from a matching factor of the emitted signal and a ground echo;
calculate an unsteadiness value, wherein the condition of the roadway portion is ascertained based on an association of the unsteadiness value with the at least one predefined classifier, wherein the unsteadiness value is derived from at least one of a maximum, minimum, variance, median, mean, skew and/or kurtosis of the ground echo, determine the variance based on peak levels in a specific distance range of the ultrasonic sensor in which a probability of occurrence of the ground echoes is greatest; and recognize an object when at least one of an amplitude of the echo and the matching factor exceeds a predefined threshold value.

7. The method as recited in claim 6, wherein the variance is determined proportionally from:
 a frequency of occurrence of received ground echoes; and/or
 an amplitude of the ground echoes; and/or
 a clutter level; and/or
 a noise level.

8. The method as recited in claim 6, wherein the classifier is stored in a higher-order central control instance external to the vehicle and is retrieved in order to ascertain the condition of the roadway portion.

9. The method as recited in claim 6, wherein a coefficient of friction of the roadway portion is ascertained based on the ascertained condition of the roadway portion.

* * * * *